(12) United States Patent
Labaj et al.

(10) Patent No.: US 9,348,888 B1
(45) Date of Patent: May 24, 2016

(54) ITERATIVE FILTER EXPRESSION PROCESSING FOR FILTERING EMBEDDED DATA OBJECTS

(71) Applicant: EMC Corporation, Hopkinton, MA (US)

(72) Inventors: Donald E. Labaj, Northborough, MA (US); Norman M. Miles, Bedford, MA (US); Scott E. Joyce, Foxboro, MA (US); Timothy Cox, Mendon, MA (US)

(73) Assignee: EMC Corporation, Hopkinton, MA (US)

( * ) Notice: Subject to any disclaimer, the term of this patent is extended or adjusted under 35 U.S.C. 154(b) by 221 days.

(21) Appl. No.: 14/034,603

(22) Filed: Sep. 24, 2013

(51) Int. Cl.
   *G06F 17/30* (2006.01)

(52) U.S. Cl.
   CPC .............................. *G06F 17/30607* (2013.01)

(58) Field of Classification Search
   USPC .......................................... 707/754, 802–803
   See application file for complete search history.

(56) References Cited

U.S. PATENT DOCUMENTS

| | | | |
|---|---|---|---|
| 6,754,884 B1 * | 6/2004 | Lucas et al. ................... | 717/108 |
| 7,117,270 B2 * | 10/2006 | Rosenblum ................... | 709/238 |
| 7,899,833 B2 * | 3/2011 | Stevens et al. ................ | 707/754 |
| 2003/0212670 A1 * | 11/2003 | Yalamanchi et al. ............ | 707/3 |
| 2004/0015783 A1 * | 1/2004 | Lennon et al. ................ | 715/523 |
| 2004/0181543 A1 * | 9/2004 | Wu et al. ........................ | 707/102 |
| 2008/0114812 A1 * | 5/2008 | Beiter et al. ................ | 707/104.1 |
| 2008/0294596 A1 * | 11/2008 | Xiong ............... | G06F 17/30427 |
| 2011/0087708 A1 * | 4/2011 | Teichmann ............ | G06Q 10/10 707/803 |
| 2011/0191328 A1 * | 8/2011 | Vernon et al. ................. | 707/723 |
| 2012/0110583 A1 * | 5/2012 | Balko ................... | G06F 9/4843 718/102 |
| 2012/0143808 A1 * | 6/2012 | Karins et al. .................... | 706/46 |
| 2013/0091153 A1 * | 4/2013 | Gitelman ....................... | 707/754 |
| 2013/0152088 A1 * | 6/2013 | Gkantsidis et al. ........... | 718/100 |

* cited by examiner

*Primary Examiner* — Hanh Thai
(74) *Attorney, Agent, or Firm* — BainwoodHuang (57) ABSTRACT

A computerized device filters a set of first data objects each including primitive-valued fields and object-valued fields each specifying a respective second data object as an embedded object. A filter object specifies filter criteria as a set of filter expressions. Each first data object and its respective embedded second filter objects are processed according to the filter expressions. The processing includes iterated execution of a filter expression loop, a first iteration producing a first filter test result for each primitive-valued field of the first data object and initiating a second iteration for each object-valued field of the first data object, and the second iteration producing a second filter test result for each primitive-valued field of the respective embedded second filter object. A given first data object is included in a final set of filtered objects only if both the first and second filter test results are success test results.

17 Claims, 5 Drawing Sheets

ITERATIVE FILTER EXPRESSION PROCESSING FOR FILTERING EMBEDDED DATA OBJECTS

BACKGROUND

The present invention is related to the field of data object processing such as in the context of displaying object data in a graphical user interface of an application.

Applications used for displaying or otherwise manipulating large amounts of structured data may employ a so-called "object model" representation by which the data is accessed. Object model representations are used, for example, in web-delivered applications and other distributed applications in which a local client device accesses the data from a remote server. An interface to the remote data may use the Representational State Transfer (REST) architecture, identifying data objects as "resources" and hiding any details of a database or other specific data-storage mechanism from the application.

One need arising in applications of this kind is to apply filters to objects so as to return only relevant object data in response to a request, thereby making efficient use of available communications bandwidth. REST APIs commonly support filtering in the form of explicit filter expressions included as part of REST requests and executed by REST servers against a larger set of data objects. Filtering is based on properties/fields of the objects.

Typical databases used to store object data include rich functionality that supports both object-model structuring as well as filtering operations. Object-model structuring can be reflected in corresponding relational structuring of tables storing object data. Databases support powerful data manipulation operations such as "joins" that can be used to create filtered results.

SUMMARY

It is common in object models that a given object includes both primitive-valued fields, i.e. fields containing data of a primitive type such as a number, text string, etc., as well as object-valued fields, i.e., fields containing references to other objects. Such referenced objects may be viewed as sub-objects or "embedded" objects of the object that references them. Embedded objects can present a particular challenge for filtering, especially when the object data is not stored in a database that provides powerful data manipulation operations such as joins. In one example herein, object data is stored in an array of files, and filtering must be performed by a server application lacking the facilities of an underlying database for satisfying requests that involve filtering. In this setting it is important to use an efficient technique for implementing filtering of objects containing embedded objects.

Thus a technique is disclosed for filtering and retrieving properties of embedded objects when the processing functions of a database are unavailable. A disclosed technique uses a tree based structure for handling the filtering of embedded objects. Each object is filtered separately, returning only the properties from that object that the user has requested. An iterated filter expression loop is employed. Whenever a new (embedded) object is found within a given object, a new logical branch is created and the filter expression loop is iterated for the embedded object.

More particularly, a method is disclosed by which a computerized device filters a set of first data objects, where each first data object includes one or more primitive-valued fields and one or more object-valued fields each specifying a respective second data object as an embedded object of the respective first data object. The method includes receiving a filter object specifying filter criteria in the form of a set of filter expressions to be applied to fields of the first and second data objects. Each first data object and its respective embedded second filter objects are processed according to the filter expressions. The processing includes iterated execution of a filter expression loop, where a first iteration produces a first filter test result for each primitive-valued field of the first data object and initiates a second iteration for each object-valued field of the first data object, and the second iteration produces a second filter test result for each primitive-valued field of the respective embedded second filter object. A given first data object is included in a final set of filtered objects only if both the first and second filter test results are success test results.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
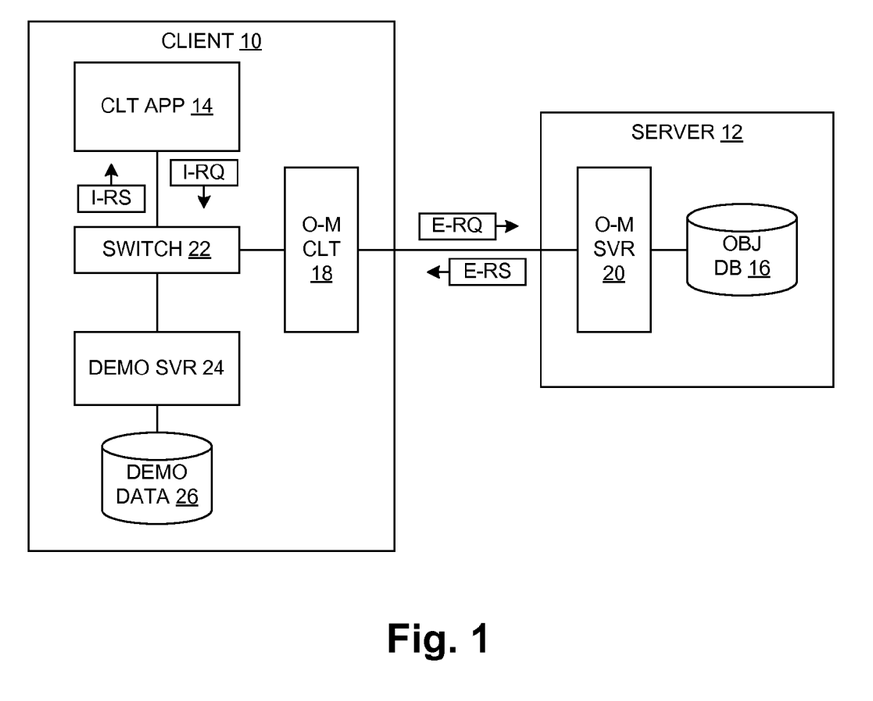
FIG. 1 is a block diagram of a computer system.

FIG. 1 shows a system in which a client computerized device or "client" 10 is communicatively coupled to a server computerized device or "server" 12. The client executes client application (CLT APP) 14 having a graphical user interface (GUI) for presenting data to a user. In a normal mode of system operation, the data to be presented is stored in an object database (OBJ DB) 16 on the server 12. Data is transferred between the client 10 and server 12 via an object-model client (O-M CLT) 18 in the client 10 and an object-model server (O-M SVR 20) in the server 12, using external requests (E-RQ) and external responses (E-RS) as shown. The data transfer path includes a switch 22 in the client 10, which is also coupled to a demonstration or "demo" server or service (DEMO SVR) 24 in the client 10. In the normal mode of system operation, the switch 22 establishes a path for transfer of internal requests (I-RQ) and internal responses (I-RS) between the client application 14 and the O-M client 18. In a separate demonstration or "demo" mode of operation, the switch 22 establishes a path for transfer of the internal requests I-RQ and internal responses I-RS between the client application 14 and the demo server/service 24, which provides responses using demonstration data (DEMO DATA) 26.

In one embodiment, the client application 14 is a web application used for management of one or more data storage systems, and the data in the object database 16 is data related to the configuration and operation of such data storage system(s). Specific examples of such data are described below. As a web application, the client application 14 may be implemented in a web-based programming language such as Java®, JavaScript™ or FLEX and delivered from the server 12 to the client 10 where it is executed. Additionally, the server 10 may itself be part of a data storage system being managed by the client application 14. Examples of this type of system and web-delivered storage management application are VNX® and VNXe® data storage arrays and UNI-SPHERE® storage management application sold by EMC Corporation.

The object database 16 may be realized as a relational database. The internals of the database 16 and the queries by which it is accessed are not visible to the object-model client 18, which instead is presented with an object-model structuring of data by the object-model server 20. In one embodiment the communications between the object-model client 18 and object-model server 20 employs a so-called RESTful application programming interface (API), where REST refers to a distributive development architecture known as "representational state transfer". This interface can also be viewed as a resource-oriented interface, as it employs resource identifiers to identify data objects that are the subjects of requests and responses. Thus in such an embodiment the external requests E-RQ and external responses E-RS are REST requests and responses respectively. Specific examples are given below.

The above-mentioned normal mode of operation occurs when the client 10 is being used to access data of the object database 16, for example as part of managing operation of a data storage system. A potentially large quantity of information may be available and used. The object database 16 may include data such as identification and configuration data for a set of storage arrays or "systems" in a managed environment (e.g., a datacenter), as well as detailed information about each system such as identification and configuration of a set of storage devices (e.g., disk drives) in each system. It may also include real-time operational data, such as monitored environmental and performance data (e.g., percent utilization, throughput, latencies, read/write command mix, etc.). Other specific examples are given below.

The purpose of the demo mode of operation is to exercise the client application 14 in more of a standalone manner, without requiring a production object database 16 or even a separate server 12. Demo mode can be used for a variety of purposes, such as development of the client application 14, training of new users, product demonstrations in support of sales and marketing activities, etc. In demo mode, the client application 14 accesses the demo data 26, which in general includes made-up or "canned" data created for demonstration purposes and not necessarily reflecting any real system or its operation. The demo data 26 may be included with the demo server/service 24 as part of a demo library provided as a component of an overall package of software components that includes the client application 14. Preferably the demo server/service 24 supports not only read access of the demo data 26 but also write access, so that demo operation more fully represents normal operation.

In general it is assumed that the demo data 26 is not provided in the form of a relational or similar structured database as is used for the object database 16. Relational databases provide a power and flexibility for data access that is not necessary for demo operation, and they also carry significant overhead and complexity in terms of design, maintenance and operation. Thus, in one embodiment the demo data 26 is provided in the form of an array of data files. In particular, so-called "configuration" files may be used, each of which includes the data for the objects of a corresponding type in the object model. In one particular embodiment, files employing JavaScript Object Notation (JSON) may be employed. Thus in the context of managing a data storage system, for example, there may be separate files for logical storage units, disks, etc. using names like LUN.JSON, DISK.JSON, etc.

Alternative data organizations include eXtensible Markup Language (XML). Object data is read by accessing the files and retrieving their contents.

The demo server/service 24 may also employ specialized routines, called "handlers" that handle the request and response/update based on the REST operation. For example, a "GET" request will simply return information, whereas a "POST"/"PUT" will add or modify information. In one embodiment, and modifications or additions are simply stored in memory—the contents of the underlying configuration file for the object is not modified. In other embodiments the configurations files may themselves be modified in response to updates. Handlers may be ordered from specific to general so that they can be searched for a handler best-suited for a particular operation. Handlers may also employ helper functions for obtaining information about objects to facilitate how the objects are subsequently manipulated. The process of updating an object may depend in some specific way, for example, on the detailed structure of that object.

One of the particular challenges of demo operation is how so-called "embedded" objects are handled, and in particular how they are filtered in response to internal requests I-RQ that include filter expressions for limiting the scope of data being accessed and returned. As described more below, the object model specifies the so-called "primitive" data that is directly associated with each object (such as a text string device identifier (primitive) for a disk drive (object)). The object model also specifies object contents that are themselves other objects. In one example described more below, a "license" object includes a "system" sub-object, i.e., a reference to a data object for a data storage system that is subject to the license, and the system object in turn includes primitives and may include other sub-objects as well. In the present description such sub-objects are also referred to as "embedded" objects. Because demo operation uses the demo data 26 rather than the more powerful structure and access methods of the object database 16, special operation is required to support filtering of embedded objects in this context.

Figure 2:
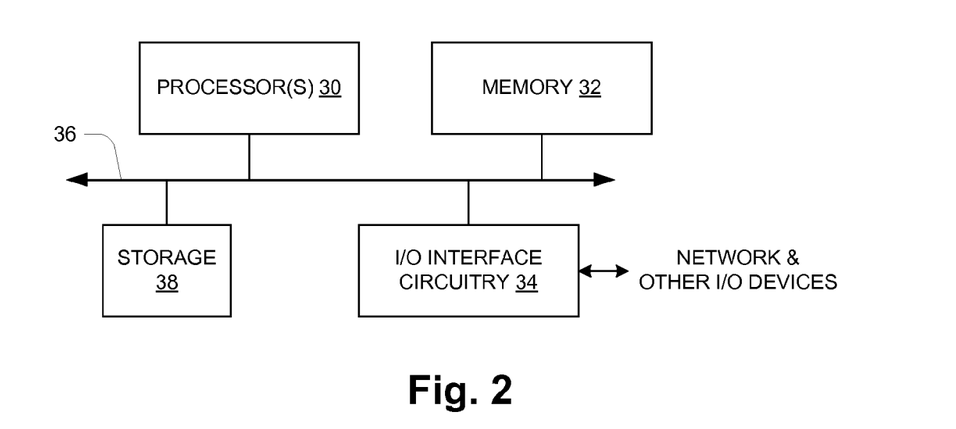
FIG. 2 is a block diagram of a computerized device.

FIG. 2 shows an example configuration of a physical computer or controller from a computer hardware perspective. In one embodiment this hardware organization applies to the client 10 and server 12 of FIG. 1. The hardware includes one or more processors 30, memory 32, and interface circuitry 34 interconnected by data interconnections 36 such as one or more high-speed data buses. The interface circuitry 36 provides a hardware connection to an external data network (e.g., for the client-server connection in FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs which are executed by the processor(s) 30 to cause the hardware to function in a software-defined manner. Thus the computer hardware executing instructions of a storage management application, such as described below, can be referred to as a storage management circuit or storage management component, and it will be understood that a collection of such circuits or components can all be realized and interact with each other as one or more sets of computer processing hardware executing different computer programs as generally known in the art.

Figure 3:
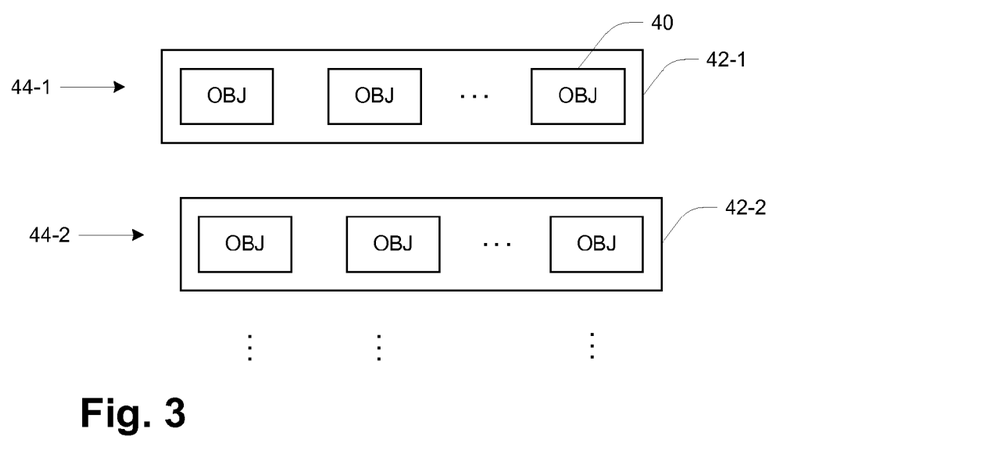
FIG. 3 is a schematic diagram of sets of objects of an object model.

FIG. 3 illustrates the above-mentioned organization of the demo data 26, i.e., the objects 40 of different types stored in respective files 42. In FIG. 3 the objects 40 of a given type are shown in a corresponding row and file 42. Thus the first row 44-1 and file 42-1 includes objects 40 of a first type, the second row includes objects 40 of a second type, etc. The purpose of FIG. 3 is to illustrate the overall structure, which is a "flat" or unstructured array of files 42 storing the respective objects 40. While a given object 40 may be a sub-object of another object 40, these relationships are not captured by the file-based organization itself—each file 42 is a standalone item unrelated at the file level to any other files 42. Relationships among the objects 40 are captured by the contents of the objects 40 as described below.

The files 42 may be named according to their type and the respective objects 40 they contain. In one embodiment, object data files such as XML or JSON files may be used. As an example to illustrate the naming, the objects 40 of row 44-1 may be License objects, and those of row 44-2 may be System objects. Thus the file 42-1 of row 44-1 may have a name like Licenses.json, for example, and the file 42-2 of row 44-2 may have a name like Systems.json, etc.

Figure 4:
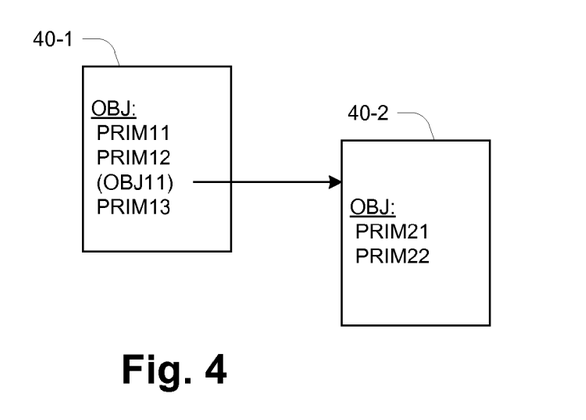
FIGS. 4 and 5 are schematic diagrams illustrating embedded object relationships.

FIG. 4 is a general depiction of the above-described sub-object or "embedded" object relationship. A first object 40-1 of a given type has object data including three primitive-valued data items (or "primitives") 50 (shown as PRIM11, PRIM12 and PRIM13). It also includes an object-valued data item OBJ11 that is the name of another object, i.e., an embedded object. In the illustrated example OBJ1 refers to the embedded object 40-2 of another type that includes two primitives PRIM21, PRIM22. In the description below, the data items of an object 40 are also referred to as "fields".

Figure 5:
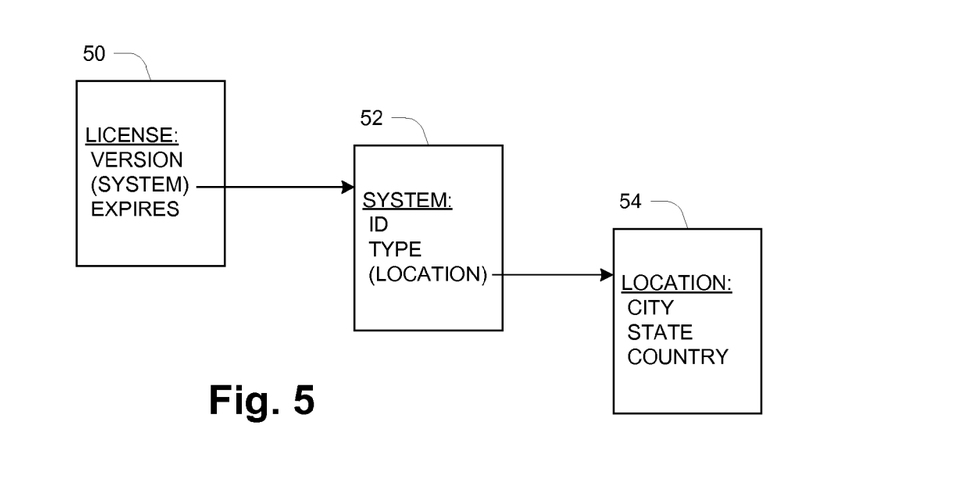

FIG. 5 shows a particular example of the structure of FIG. 4 that is used for illustration in the description below. A License object 50 includes three fields Version, (System), and Expires, with Version and Expires being primitives (a version identifier and an expiration date, respectively) and (System) being a reference to an embedded System object 52. The System object 52 includes primitive-valued fields ID and Type (system identifier and system type, respectively), and an object-valued field (Location) being a reference to a Location object 54. The Location object 54 includes three primitive-valued fields (all text strings) City, State and Country.

It will be appreciated that the totality of relevant information about all the Licenses in a system is stored in not just the respective License objects 50, but also in the embedded System objects 52 and Location objects 54 stored in separate files 42. This organization presents challenges for applications making certain uses of the object data, in particular to applications performing filtering of object data as described more below. The file system of the client 10 provides no specific support for filtering, in contrast to a typical database application (i.e., for the O-M database 16) that provides for rich structuring of data as well as powerful data-manipulation procedures such as Joins that can be used for filtering. Thus the techniques described below are used to support filtering of object data in environments such as the demo environment in which the features of a database are not available.

Figure 6:
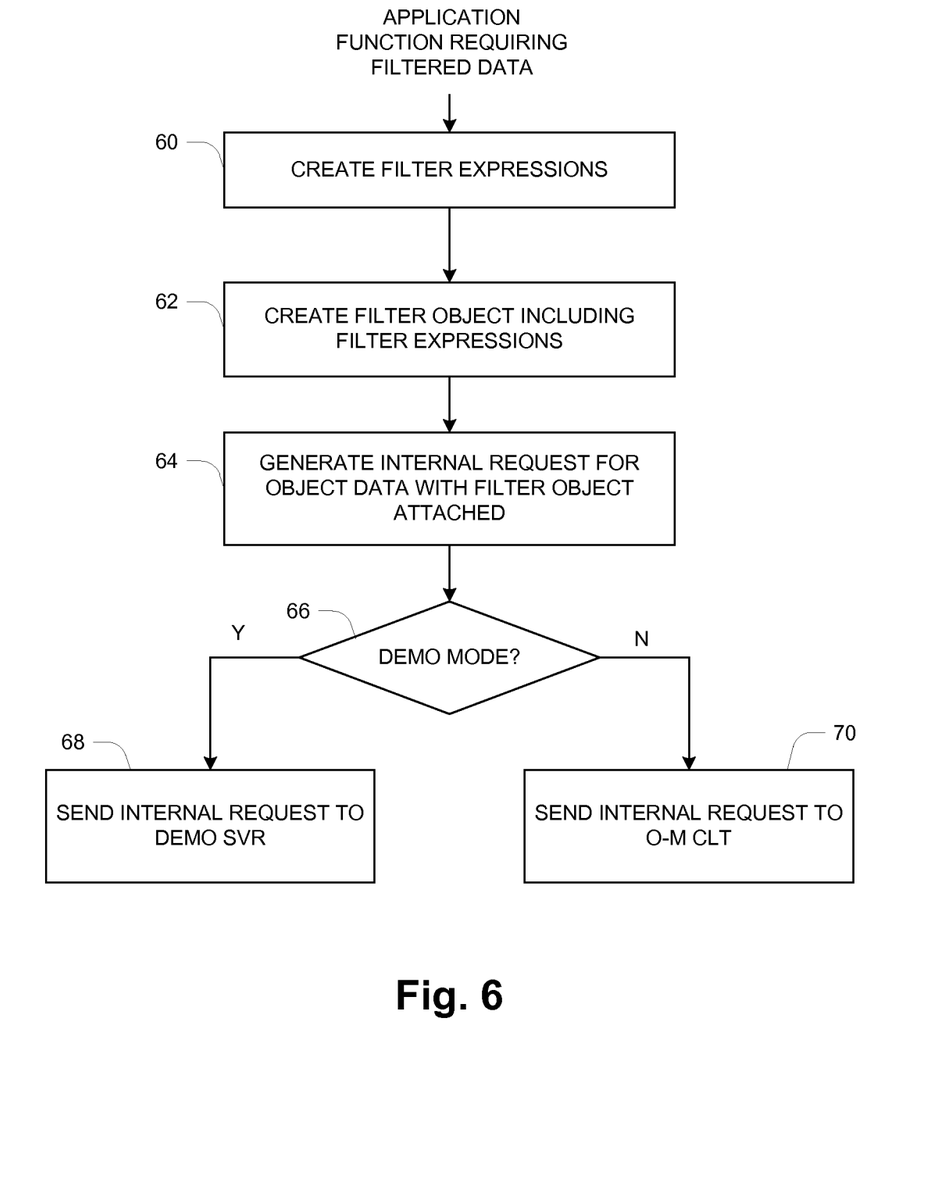
FIG. 6 is a flow chart of first operations of a client device.

FIG. 6 illustrates one aspect of operation of the system of FIG. 1, performed as part of a function of the client application 14 that requires filtered data. In one embodiment, the GUI of the client application may be presenting aggregated data to a user in the user in a form such as a table, chart, etc. With respect to the License example being used herein, a GUI display may present a chart of the number of active licenses over a period of time, for example. Now it is assumed that there is a need to obtain a more selective view of the data. For example, a user may specify that he/she only wants to see data for systems located in certain parts of the country. This data is to be obtained by applying a filter to a larger collection of data. Again referring to the License example, the License objects 50 whose data is to be presented is filtered based on the contents of the Location objects 54 of the embedded Systems objects 52 of the License objects 50.

At 60, one or more filter expressions are created based on the higher-level filter function being performed, and at 62 a Filter object is created that includes the filter expressions. At 64, an internal request I-RQ is generated identifying object data to be obtained and returned to the requestor, such as the client application 14. To this request is attached the Filter object created at 62.

Step 66 corresponds to the functionality of the switch 22 of FIG. 1. In demo mode, operation proceeds to 68 where the internal request and attached Filter object are sent to the demo server/service 24, while normal operation proceeds to 70 where the internal request and attached Filter object are sent to the O-M client 18. Processing by the demo server/service 24 is described below. In normal operation the O-M client 18 uses the internal request and Filter object to create the RESTful external request E-RQ sent to the server 12. Although not shown in FIG. 6, at a later time the O-M client 18 receives a corresponding external response E-RS, uses the contents to create a corresponding internal response I-RS and forwards this to the client application 14 via the switch 22.

Figure 7A:
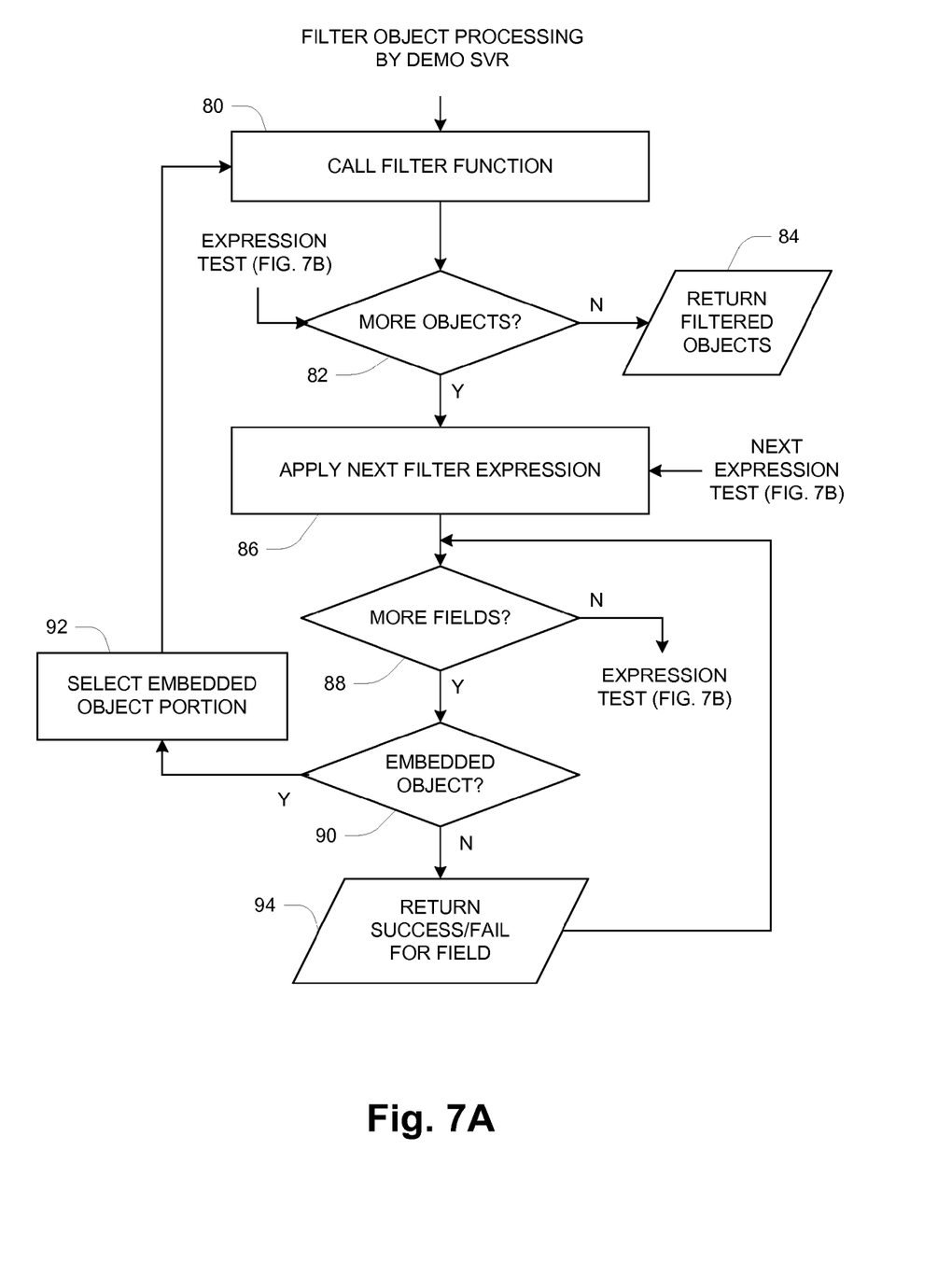
FIG. 7 (consisting of sub-FIGS. 7A and 7B) is a flow chart of filtering-related operations of a demo server or service.
Figure 7B:
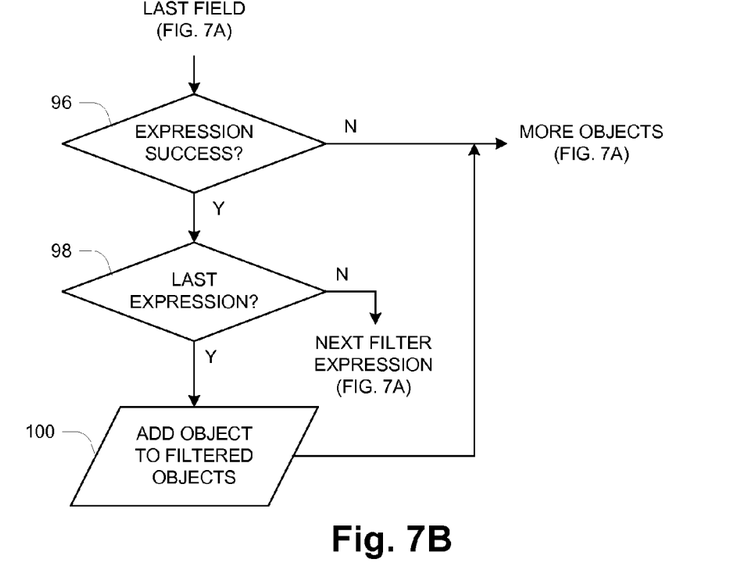

FIG. 7 (consisting of sub-parts 7A and 7B) illustrates processing of the internal request I-RQ at the demo server/service 24, specifically the processing for the Filter object accompanying the internal request. At 80, the demo server/service 24 calls an internal filter function whose task is to process the Filter object. First at 82 is a test whether there are additional objects to be filtered. This test establishes iteration for each of the objects at a given level. For the example of FIG. 5, iteration will occur for each License object 50 contained in the demo data 26. As part of this iteration, further iteration will occur for embedded objects as explained below.

When all objects have been processed, at 84 the collection or array of filtered objects that have been produced in the processing of FIG. 7 are returned as part of the internal response I-RS to the client application 16.

At 86 a next filter expression of the Filter object is applied to a next object 40 that is the subject of the request. Example filter expressions are given below. Applying the filter expression generates a result indicating whether the object meets the specified criteria (success) or does not meet the specified criteria (failure). This result is used in a test explained below.

At 88 is a test whether there are more fields to be processed for the current object. If not, then processing proceeds to step 96 described below. If there are more fields, then at 90 is a test whether the next field is an embedded object. If not, i.e., if the field is a primitive-valued field, then at 94 the success/failure result for this field is recorded, and processing returns to the next-field test 88. This path represents iteration for all primitive-valued fields that are specified for testing according to a given filter expression. If at 90 it is determined that the next field is an embedded object, then at 92 the embedded object portion is selected, and a new iteration is begun at 80 for the embedded object portion. It will be appreciated that this represents movement to a next lower level in a multi-level arrangement of objects. For example with reference to FIG. 5, the iteration path from 90 to 92 and 80 is executed first for the System embedded object 52 and then a second time for the Location embedded object 54.

Step 96 (FIG. 7B) is performed once all the fields for a given filter expression have been processed. At this step it is determined whether the overall result for the expression is success or failure, i.e., whether or not all fields have had a "success" indication recorded at respective iterations of step 94. If not, then the expression fails overall, which in turn means that the object being processed does not meet the filter criteria. Thus, processing stops for the current object, and instead returns to 82 for a next object.

If the filter expression has succeeded for the current object, then at 98 it is tested whether this is the last filter expression of the Filter object. If not, then processing iterates by returning to step 86 for a next filter expression. If this is the last filter expression, then the current object has satisfied the Filter object and is added to the collection of filtered objects 84 to be returned.

Below is a specific example of an internal request I-RQ and corresponding Filter object. The internal request is for licenses that of either of two specific versions or are for systems other than those located in Arizona, and that expire before Nov. 30, 2013. The Filter object is created to include filter expressions accordingly.

Internal Request GET /api/types/license/instances?filter= (version eq 1.0.1 OR version eq 1.0.2 OR system.location-.state ne Arizona) AND expires lt 2013-11-30T12::00.000Z

```
Filter Object
Filter = Ext.create ("EMC.core.data.model.Filter",
[{ expressions:
    [{ operator:EMC.core.data.model.FilterExpression.EQUAL,
field: "version", values: [1.0.1, 1.0.2]},
    { operator:EMC.core.data.model.FilterExpression.NOT_EQUAL,
field: "system.location.state", values: "Arizona" }]},
    { expressions:
        { operator: EMC.core.data.model.FilterExpression.LESS_THAN,
field: "expires", values: "2013-11-30T12::00.000Z" }]);
```

Figure 8:
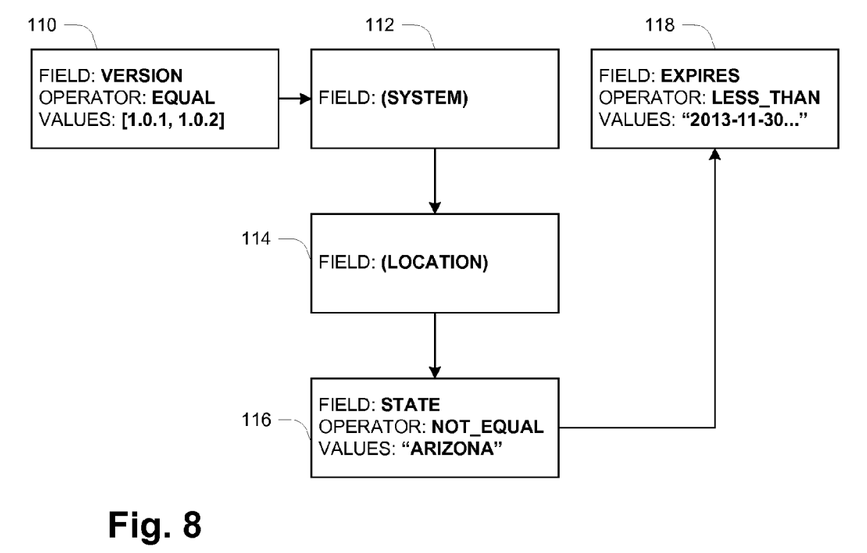
FIG. 8 is a schematic depiction of processing of a set of filter expressions of a filter object.

FIG. 8 is a graphical depiction of the processing of the above example Filter object, also reflecting the general organization of FIG. 5. Item 110 represents the filter expression for the Version field, including the operator Equal and the alternative values [1.0.1, 1.0.2] that can satisfy the expression. Items 112, 114 and 116 represent the filter expression for the System.Location.State field, including the operator Not_Equal and the value as the text string "Arizona". Item 118 represents the filter expression for the Expires field, including the operator Less_Than and the value as the date string "2013-11-30 . . . " as given above. The organization of FIG. 8 illustrates the multiple levels or iterations of processing. Items 110, 112 and 118 correspond to processing of an individual License object itself, with 110 and 118 providing direct results by processing of the Version and Field primitives. Item 112 represents the identification of the System field as an embedded object of the License object and iterating to a next level. Similarly item 114 represents identification of the Location field as an embedded object of the System object and iterating to a next level. Item 116 represents the processing of the primitive-valued State field of the Location object.

While various embodiments of the invention have been particularly shown and described, it will be understood by those skilled in the art that various changes in form and details may be made therein without departing from the spirit and scope of the invention as defined by the appended claims.

What is claimed is:

1. A method by which a computerized device filters a set of first data objects, each first data object including one or more primitive-valued fields and one or more object-valued fields each specifying a respective second data object as an embedded object of the respective first data object, comprising:
receiving, by the computerized device, a filter object specifying filter criteria in the form of a set of filter expressions to be applied to fields of the first and second data objects; and
processing, by the computerized device, each first data object and its respective embedded second filter objects according to the filter expressions, the processing including iterated execution of a filter expression loop, a first iteration producing a first filter test result for each primitive-valued field of the first data object and initiating a second iteration for each object-valued field of the first data object, the second iteration producing a second filter test result for each primitive-valued field of the respective embedded second filter object, and wherein a given first data object is included in a final set of filtered objects only if both the first and second filter test results are successful test results,
wherein the filter expression loop includes an outer loop and an inner loop, the outer loop corresponding to a given iteration, the inner loop being repeated for each of the primitive-valued fields,
and wherein the inner loop repeats for each of the fields of the first data object and includes a test whether a current field is object-valued before processing the current field as primitive-valued, a given repetition of the inner loop escaping to the outer loop for a field identified by the test as object-valued.

2. A method according to claim 1, wherein an object-valued field includes a multi-level object identifier, and wherein the second iteration includes an initial selecting of an embedded object portion of the multi-level object identifier.

3. A method according to claim 1, wherein processing includes a per-expression test whether a given filter expression is satisfied for each object, the processing being terminated for a given object upon a first failure of the per-expression test, the processing continuing to a step of including the given object in the final set of filtered objects only if the per-expression test is satisfied for each filter expression of the filter object.

4. A method according to claim 1, performed by the computerized device as part of a demonstration mode of operation of the computerized device and in which the filter object is a demo filter object and the data objects are demo data objects, the computerized device also being operative in a normal mode of operation in which a production filter object organized the same as the demo filter object is used by an object-model client of the computerized device to generate an object data request to an object-model database storing production data objects for operating components of a system.

5. A method according to claim 4, wherein the computerized device includes a switch operative to direct filter objects to a demo server/service in the demonstration mode of operation and to the object-model client in the normal mode of operation.

6. A method according to claim 5, wherein the filter objects are created by an application executing on the computerized device, the application using the final set of filtered objects to populate a graphical user interface with filtered aggregate data for use by a user.

7. A method according to claim 6, wherein the application is a system management application, the production data objects contain realtime operating data for the operating components of the system, and the demo data objects contain predetermined demo data stored with the application and not pertaining to operation of the system.

8. A method according to claim 6, wherein the application generates internal service requests accompanied by the filter object, the internal service requests being satisfied by the demo server/service in the demonstration mode of operation and by the object-model client in the normal mode of operation.

9. A method according to claim 4, wherein the object-model client employs a resource-oriented interface to the object-model database and is operative to generate resource-oriented object data requests with explicit filter statements based on contents of the filter object.

10. A non-transitory computer-readable medium having computer program instructions recorded thereon, the instructions being operative, when executed by a computerized device, to cause the computerized device to perform a method of filtering a set of first data objects, each first data object including one or more primitive-valued fields and one or more object-valued fields each specifying a respective second data object as an embedded object of the respective first data object, the method including:
receiving a filter object specifying filter criteria in the form of a set of filter expressions to be applied to fields of the first and second data objects; and
processing each first data object and its respective embedded second filter objects according to the filter expressions, the processing including iterated execution of a filter expression loop, a first iteration producing a first filter test result for each primitive-valued field of the first data object and initiating a second iteration for each object-valued field of the first data object, the second iteration producing a second filter test result for each primitive-valued field of the respective embedded second filter object, and wherein a given first data object is included in a final set of filtered objects only if both the first and second filter test results are success test results,
wherein the filter expression loop includes an outer loop and an inner loop, the outer loop corresponding to a given iteration, the inner loop being repeated for each of the primitive-valued fields,
and wherein the inner loop repeats for each of the fields of the first data object and includes a test whether a current field is object-valued before processing the current field as primitive-valued, a given repetition of the inner loop escaping to the outer loop for a field identified by the test as object-valued.

11. A non-transitory computer-readable medium according to claim 10, wherein processing includes a per-expression test whether a given filter expression is satisfied for each object, the processing being terminated for a given object upon a first failure of the per-expression test, the processing continuing to a step of including the given object in the final set of filtered objects only if the per-expression test is satisfied for each filter expression of the filter object.

12. A non-transitory computer-readable medium according to claim 10, wherein the method is performed as part of a demonstration mode of operation of the computerized device and in which the filter object is a demo filter object and the data objects are demo data objects, the method further including operating the computerized device in a normal mode of operation in which a production filter object organized the same as the demo filter object is used by an object-model client to generate an object data request to an object-model database storing production data objects for operating components of a system.

13. A non-transitory computer-readable medium according to claim 12, wherein the computerized device includes a switch operative to direct filter objects to a demo server/service in the demonstration mode of operation and to the object-model client in the normal mode of operation.

14. A non-transitory computer-readable medium according to claim 13, wherein the filter objects are created by an application executing on the computerized device, the application using the final set of filtered objects to populate a graphical user interface with filtered aggregate data for use by a user.

15. A non-transitory computer-readable medium according to claim 14, wherein the application is a system management application, the production data objects contain real-time operating data for the operating components of the system, and the demo data objects contain predetermined demo data stored with the application and not pertaining to operation of the system.

16. A non-transitory computer-readable medium according to claim 15, wherein the application generates internal service requests accompanied by the filter object, the internal service requests being satisfied by the demo server/service in the demonstration mode of operation and by the object-model client in the normal mode of operation.

17. A non-transitory computer-readable medium according to claim 12, wherein the object-model client employs a resource-oriented interface to the object-model database and is operative to generate resource-oriented object data requests with explicit filter statements based on contents of the filter object.

* * * * *